(12) United States Patent
Wieber

(10) Patent No.: US 8,158,070 B1
(45) Date of Patent: Apr. 17, 2012

(54) APPARATUS FOR HYDROPROCESSING TWO STREAMS

(75) Inventor: Andrew P. Wieber, Chicago, IL (US)

(73) Assignee: UOP LLC, Des Plaines, IL (US)

( * ) Notice: Subject to any disclaimer, the term of this patent is extended or adjusted under 35 U.S.C. 154(b) by 0 days.

(21) Appl. No.: 13/076,680

(22) Filed: Mar. 31, 2011

(51) Int. Cl.
B01J 8/00 (2006.01)
C07C 5/00 (2006.01)

(52) U.S. Cl. ........ 422/187; 585/250; 585/251; 585/265; 585/310

(58) Field of Classification Search .................. 422/187; 585/250, 151, 265, 310, 251
See application file for complete search history.

(56) References Cited

U.S. PATENT DOCUMENTS

| | | | |
|---|---|---|---|
| 3,592,757 A * | 7/1971 | Baral | 208/58 |
| 3,598,722 A | 8/1971 | Carson | |
| 3,655,551 A | 4/1972 | Hass et al. | |
| 4,212,729 A | 7/1980 | Hensley, Jr. et al. | |
| 5,403,469 A | 4/1995 | Vauk et al. | |
| 5,447,621 A * | 9/1995 | Hunter | 208/58 |
| 5,453,177 A | 9/1995 | Goebel et al. | |
| 5,968,346 A | 10/1999 | Jung et al. | |
| 6,123,830 A | 9/2000 | Gupta et al. | |
| 6,149,800 A | 11/2000 | Iaccino et al. | |
| 6,294,080 B1 | 9/2001 | Thakkar et al. | |
| 6,444,116 B1 | 9/2002 | Galiasso et al. | |
| 6,656,348 B2 | 12/2003 | Dassori et al. | |
| 6,676,828 B1 | 1/2004 | Galiasso et al. | |
| 6,740,226 B2 | 5/2004 | Mehra et al. | |
| 6,843,906 B1 | 1/2005 | Eng | |
| 7,074,321 B1 | 7/2006 | Kalnes | |
| 7,087,153 B1 | 8/2006 | Kalnes | |
| 7,097,760 B1 | 8/2006 | Kalnes et al. | |
| 7,238,275 B2 | 7/2007 | Stupin et al. | |
| 7,238,277 B2 | 7/2007 | Dahlberg et al. | |
| 7,271,303 B1 | 9/2007 | Sechrist et al. | |
| 7,470,358 B1 | 12/2008 | Kalnes | |
| 7,507,325 B2 | 3/2009 | Gueret et al. | |
| 7,531,082 B2 | 5/2009 | Mukherjee et al. | |
| 7,686,941 B2 | 3/2010 | Brierley et al. | |
| 7,790,020 B2 | 9/2010 | Kokayeff et al. | |
| 7,794,588 B2 | 9/2010 | Kokayeff et al. | |
| 7,815,791 B2 | 10/2010 | Keusenkothen | |
| 7,837,860 B1 | 11/2010 | Hoehn et al. | |

(Continued)

FOREIGN PATENT DOCUMENTS

EP 0665283 A2 8/1995

(Continued)

OTHER PUBLICATIONS

Bhaskar, "Mild hydrocracking of FCC feeds yields more fuels, boosts margins", Oil & Gas Journal, Jun. 10, 2002, pp. 62-65.

(Continued)

*Primary Examiner* — Walter D Griffin
*Assistant Examiner* — Huy-Tram Nguyen
(74) *Attorney, Agent, or Firm* — James C. Paschall

(57) ABSTRACT

An apparatus is disclosed for hydroprocessing two hydrocarbon streams at two different pressures. A hydrogen stream is compressed and split. A first split compressed stream is further compressed to feed a first hydroprocessing unit that requires higher pressure for operation. A second split compressed stream is fed to a second hydroprocessing unit that requires lower pressure. Recycle hydrogen from the second hydroprocessing unit is recycled back to the compression section.

16 Claims, 2 Drawing Sheets

U.S. PATENT DOCUMENTS

| | | |
|---|---|---|
| 2003/0089638 A1 | 5/2003 | Gueret et al. |
| 2007/0017851 A1 | 1/2007 | Mehra et al. |
| 2009/0313890 A1 | 12/2009 | Lopez et al. |
| 2009/0321310 A1 | 12/2009 | Kokayeff et al. |
| 2009/0321319 A1 | 12/2009 | Kokayeff et al. |
| 2010/0160699 A1 | 6/2010 | Frey et al. |
| 2010/0200458 A1 | 8/2010 | Kalnes |

FOREIGN PATENT DOCUMENTS

| | | |
|---|---|---|
| WO | 2009008878 A1 | 1/2009 |
| WO | 2009008879 A1 | 1/2009 |

OTHER PUBLICATIONS

Bollinger, "Optimizing Hydrocracker Hydrogen", Chemical Engineering Progress, May 1984, pp. 51-57.

Kimbrell, "Hydrogen Processing", Question and Answer Session on Refining and Petrochemical Technology, pp. 151-152, presented at the NPRA Conference, 1996.

Putek, "Upgrade hydrocracked resid through integrated hydrotreating", Hydrocarbon Processing, Sep. 2008, pp. 83-92.

Turner, "Consider revamping hydrotreaters to handle higher H2 partial pressures", Hydrocarbon Processing, Mar. 2004, pp. 61-70.

Zhu, "Application of high pressure hot separation schemes in hydrocrackers", Petroleum Refinery Engineering, Sep. 1995, vol. 25, No. 5, pp. 1-5. (in Chinese with full translation).

U.S. Appl. No. 13/076,647, filed Mar. 31, 2011, Wieber.
U.S. Appl. No. 13/076,658, filed Mar. 31, 2011, Wieber.
U.S. Appl. No. 13/076,670, filed Mar. 31, 2011, Wieber.
U.S. Appl. No. 13/076,608, filed Mar. 31, 2011, Wieber.
U.S. Appl. No. 13/076,631, filed Mar. 31, 2011, Wieber.
U.S. Appl. No. 13/167,945, filed Jun. 24, 2011, Wieber.
U.S. Appl. No. 13/167,979, filed Jun. 24, 2011, Wieber.
U.S. Appl. No. 13/168,052, filed Jun. 24, 2011, Wieber.
U.S. Appl. No. 13/168,078, filed Jun. 24, 2011, Wieber.

* cited by examiner

APPARATUS FOR HYDROPROCESSING TWO STREAMS

FIELD OF THE INVENTION

The field of the invention is the hydroprocessing of two hydrocarbon streams at different pressures.

BACKGROUND OF THE INVENTION

Hydrocracking refers to a process in which hydrocarbons crack in the presence of hydrogen and catalyst to lower molecular weight hydrocarbons. Depending on the desired output, the hydrocracking zone may contain one or more beds of the same or different catalyst. Hydrocracking is a process used to crack hydrocarbon feeds such as vacuum gas oil (VGO) to diesel, including kerosene, and gasoline motor fuels.

Mild hydrocracking is generally used upstream of a fluid catalytic cracking (FCC) unit or other process unit to improve the quality of an unconverted oil that can be fed to the downstream unit, while converting part of the feed to lighter products such as diesel. As world demand for diesel motor fuel is growing relative to gasoline motor fuel, mild hydrocracking is being considered for biasing the product slate in favor of diesel at the expense of gasoline. Mild hydrocracking may be operated with less severity than partial or full conversion hydrocracking to balance production of diesel with the FCC unit, which primarily is used to make naphtha. Partial or full conversion hydrocracking is used to produce diesel with less yield of the unconverted oil which can be fed to a downstream unit.

Due to environmental concerns and newly enacted rules and regulations, saleable diesel must meet lower and lower limits on contaminates, such as sulfur and nitrogen. New regulations require essentially complete removal of sulfur from diesel. For example, the ultra low sulfur diesel (ULSD) requirement is typically less than about 10 wppm sulfur.

Integration of hydroprocessing units may involve situations where one unit runs at a higher pressure than the other unit. For example, a hydrocracking unit typically runs at a higher pressure than a hydrotreating unit. Hydrogen must be supplied at different pressures. Excess hydrogen is recycled through a recycle gas compressor dedicated to each hydroprocessing unit.

There is a continuing need, therefore, for improved methods of producing more diesel from hydrocarbon feedstocks than gasoline. Such methods must ensure that the diesel meet increasingly stringent product requirements. There is also need for improved methods of supplying hydrogen to separate process units at different pressures.

BRIEF SUMMARY OF THE INVENTION

In an apparatus embodiment, the invention comprises an apparatus for hydroprocessing two hydrocarbon streams comprising a make-up hydrogen line for carrying a make-up hydrogen stream. A first compressor in is communication with the make-up hydrogen line for compressing the make-up hydrogen stream to provide a first compressed make-up hydrogen stream. A split is in communication with the first compressor for splitting the first compressed make-up hydrogen stream into a first portion in a first split line and a second portion in a second split line. A second compressor is in communication with the first split line for compressing the first portion of the first compressed make-up hydrogen stream to provide a second compressed make-up hydrogen stream in a second compressed make-up hydrogen line. A first hydroprocessing reactor is in communication with the first split line for hydroprocessing a first hydrocarbon stream. A second hydroprocessing reactor is in communication with the second split line for hydroprocessing a second hydrocarbon stream. A separator is in communication with the second hydroprocessing reactor for separating a second hydroprocessing effluent stream into a vaporous second hydroprocessing effluent stream comprising hydrogen in an overhead line. Lastly, the second compressor is in communication with the overhead line.

In an additional apparatus embodiment, the invention additionally comprises an apparatus for hydroprocessing two hydrocarbon streams comprising a make-up hydrogen line for carrying a make-up hydrogen stream. A first compressor is in communication with the make-up hydrogen line for compressing the make-up hydrogen stream to provide a first compressed make-up hydrogen stream. A split is in communication with the first compressor for splitting the first compressed make-up hydrogen stream into a first portion in a first split line and a second portion in a second split line comprising a second hydroprocessing hydrogen stream. A second compressor is in communication with the first split line for compressing the first portion of the first compressed make-up hydrogen stream to provide a second compressed make-up hydrogen stream in a second compressed make-up hydrogen line. A hydrocracking reactor is in communication with the first split line for hydrocracking a first hydrocarbon stream to lower boiling hydrocarbons. A hydrotreating reactor is in communication with the second split line for hydrotreating a second hydrocarbon stream. A separator is in communication with the hydrotreating reactor for separating a second hydroprocessing effluent stream into a vaporous second hydroprocessing effluent stream comprising hydrogen in an overhead line. Lastly, the second compressor is in communication with the overhead line at a junction on the first split line.

In a further apparatus embodiment, the invention comprises an apparatus for hydroprocessing two hydrocarbon streams comprising a make-up hydrogen line for carrying a make-up hydrogen stream. A first compressor is in communication with the make-up hydrogen line for compressing the make-up hydrogen stream to provide a first compressed make-up hydrogen stream. A split is in communication with the first compressor for splitting the first compressed make-up hydrogen stream into a first portion in a first split line and a second portion in a second split line comprising a second hydroprocessing hydrogen stream. A second compressor is in communication with the first split line for compressing the first portion of the first compressed make-up hydrogen stream to provide a second compressed make-up hydrogen stream in a second compressed make-up hydrogen line. A hydrocracking reactor is in communication with the first split line for hydrocracking a first hydrocarbon stream to lower boiling hydrocarbons. A hydrotreating reactor is in communication with the second split line for hydrotreating a second hydrocarbon stream. A separator is in communication with the hydrotreating reactor for separating a second hydroprocessing effluent stream into a vaporous second hydroprocessing effluent stream comprising hydrogen in an overhead line. The first compressor is in communication with the overhead line at a junction on the make-up hydrogen line.

DEFINITIONS

Figure 1:
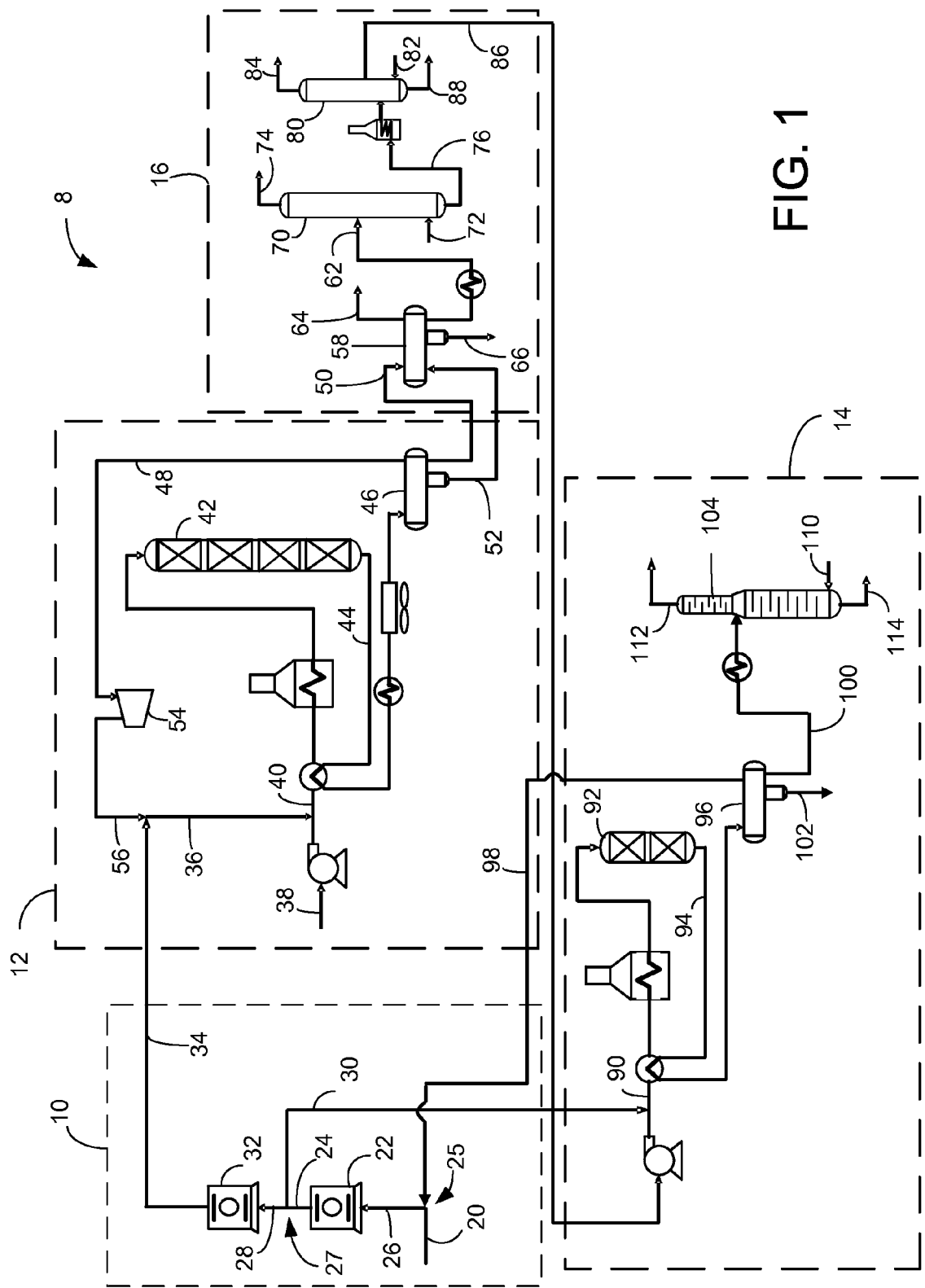
FIG. 1 is a simplified process flow diagram of an embodiment of the present invention.

The term "communication" means that material flow is operatively permitted between enumerated components.

The term "downstream communication" means that at least a portion of material flowing to the subject in downstream communication may operatively flow from the object with which it communicates.

The term "upstream communication" means that at least a portion of the material flowing from the subject in upstream communication may operatively flow to the object with which it communicates.

The term "column" means a distillation column or columns for separating one or more components of different volatilities. Unless otherwise indicated, each column includes a condenser on an overhead of the column to condense and reflux a portion of an overhead stream back to the top of the column and a reboiler at a bottom of the column to vaporize and send a portion of a bottoms stream back to the bottom of the column. Feeds to the columns may be preheated. The top pressure is the pressure of the overhead vapor at the vapor outlet of the column. The bottom temperature is the liquid bottom outlet temperature. Overhead lines and bottoms lines refer to the net lines from the column downstream of the reflux or reboil to the column.

As used herein, the term "True Boiling Point" (TBP) means a test method for determining the boiling point of a material which corresponds to ASTM D2892 for the production of a liquefied gas, distillate fractions, and residuum of standardized quality on which analytical data can be obtained, and the determination of yields of the above fractions by both mass and volume from which a graph of temperature versus mass % distilled is produced using fifteen theoretical plates in a column with a 5:1 reflux ratio.

As used herein, the term "conversion" means conversion of feed to material that boils at or below the diesel boiling range. The cut point of the diesel boiling range is between about 343° and about 399° C. (650° to 750° F.) using the True Boiling Point distillation method.

As used herein, the term "diesel boiling range" means hydrocarbons boiling in the range of between about 132° and about 399° C. (270° to 750° F.) using the True Boiling Point distillation method.

DETAILED DESCRIPTION

Two-stage hydroprocessing units often run at different pressures and both hydroprocessing units each have their own dedicated recycle gas compressor. When one of the hydroprocessing units is a typical hydrotreating unit, it has a recycle gas compressor which draws its gas from a cold separator downstream of the hydrotreating reactor and recycles hydrogen rich gas to the hydrotreating reactor inlet. A make-up gas stream is typically required for both hydroprocessing units.

The recycle gas compressor on one of the hydroprocessing units may be eliminated by pulling gas from the makeup gas compression system used by a first hydroprocessing unit, which may be a hydrocracking unit. The make-up gas stream may be drawn from the discharge of a first compression stage and returned upstream or downstream of the first compression stage. A second compression stage, downstream of the first compression stage may boost make-up gas pressure up to the higher pressure required by the first hydroprocessing unit. Only a portion of the make-up hydrogen is directed to the second hydroprocessing unit which may be a hydrotreating unit.

Mild hydrocracking reactors operate at low severity and therefore low conversion. The diesel produced from mild hydrocracking is not of sufficient quality to meet applicable fuel specifications particularly with regard to sulfur. As a result, the diesel produced from mild hydrocracking may be processed in a hydrotreating unit to allow blending into finished diesel. In many cases, it is attractive to integrate the mild hydrocracking unit and the hydrotreating units to reduce capital and operating costs.

Turning to FIG. 1, the apparatus and process 8 for producing diesel comprise a compression section 10, a first hydroprocessing unit 12, a second hydroprocessing unit 14 and a fractionation section 16. A first hydrocarbon feed 38 may be fed to the first hydroprocessing unit 12 and converted to lower boiling hydrocarbons such as diesel. The effluent from the first hydroprocessing unit 12 may be fractionated in a fractionation section 16, and fractionated product may be forwarded to the second hydroprocessing unit 14. The first hydroprocessing unit 12 operates at a higher pressure than the second hydroprocessing unit 14.

A make-up hydrogen stream in make-up hydrogen line 20 is fed to a first compressor 22 to boost the pressure of the make-up hydrogen stream and provide a first compressed make-up hydrogen stream in line 24. The make-up hydrogen stream in line 20 may first be joined by a vaporous second hydroprocessing effluent stream in line 98 at a first junction 25 to provide a combined stream in line 26 upstream of the first compressor 22. The combined stream in line 26 may then be compressed in the first compressor 22 to provide the first compressed make-up hydrogen stream in a compressed make-up hydrogen line 24. The first compressor 22 may represent a series of compressors.

A split 27 on the compressed make-up hydrogen line 24 allows a first portion of compressed make-up hydrogen to be taken in a first split line 28 and a second portion of compressed make-up hydrogen to be taken in a second split line 30. The second portion of compressed make-up hydrogen in the second split line 30 is forwarded to the second hydroprocessing unit 14.

The first portion of compressed make-up hydrogen in the first split line 28 may be further compressed in a second compressor 32, which may be a series of compressors to provide a second compressed make-up stream in line 34. The second compressed make-up stream in line 34 may be joined by a recycle hydrogen stream in line 56 to provide a first hydroprocessing hydrogen stream in line 36. The first hydroprocessing unit 12 operates at a higher pressure than the second hydroprocessing unit 14.

The first hydroprocessing hydrogen stream in line 36 taken from the second compressed make-up hydrogen stream may join a first hydrocarbon feed stream in line 38 to provide a first hydroprocessing feed stream in line 40.

The hydrocarbon feed stream is introduced in line 38 perhaps through a surge tank. In one aspect, the process and apparatus described herein are particularly useful for hydroprocessing a hydrocarbonaceous feedstock. Illustrative hydrocarbon feedstocks include hydrocarbonaceous streams having components boiling above about 288° C. (550° F.), such as atmospheric gas oils, VGO, deasphalted, vacuum, and atmospheric residua, coker distillates, straight run distillates, solvent-deasphalted oils, pyrolysis-derived oils, high boiling synthetic oils, cycle oils, hydrocracked feeds, cat cracker distillates and the like. These hydrocarbonaceous feed stocks may contain from about 0.1 to about 4 wt-% sulfur.

A suitable hydrocarbonaceous feedstock is a VGO or other hydrocarbon fraction having at least about 50 percent by weight, and usually at least about 75 percent by weight, of its components boiling at a temperature above about 399° C. (750° F.). A typical VGO normally has a boiling point range between about 315° C. (600° F.) and about 565° C. (1050° F.).

A first hydroprocessing reactor 42 may be in downstream communication with the one or more compressors 22 and 32 on the make-up hydrogen line 20, the first hydrocarbon feed line 38 and the first split line 28. The first hydroprocessing feed stream may be heat exchanged with a first hydroprocessed effluent stream in line 44 and further heated in a fired heater before entering the first hydroprocessing reactor 42 for hydroprocessing the first hydrocarbon stream. The first hydroprocessing reactor 42 may comprise one or more vessels, multiple beds of catalyst in each vessel and various combinations of hydrotreating catalyst and hydrocracking catalyst in one or more vessels.

The hydroprocessing performed in the first hydroprocessing reactor 42 may be hydrocracking. In an aspect, the first hydroprocessing unit may be a hydrocracking unit 12 in which case, the first hydroprocessing hydrogen stream is a hydrocracking hydrogen stream in line 36, the first hydroprocessing reactor 42 is a hydrocracking reactor in downstream communication with the first split line 28 and the feed stream in line 40 is a hydrocracking feed stream.

Hydrocracking refers to a process in which hydrocarbons crack in the presence of hydrogen to lower molecular weight hydrocarbons. In some aspects, the hydrocracking reaction provides total conversion of at least about 20 vol-% and typically greater than about 60 vol-% of the hydrocarbon feed to products boiling below the diesel cut point. The hydrocracking reactor 42 may operate at partial conversion of more than about 50 vol-% or full conversion of at least about 90 vol-% of the feed based on total conversion. To maximize diesel, full conversion is effective. The first vessel or bed in the hydrocracking reactor 42 may include hydrotreating catalyst for the purpose of demetallizing, desulfurizing or denitrogenating the hydrocracking feed.

The hydrocracking reactor 42 may be operated at mild hydrocracking conditions. At the mild hydrocracking conditions, the feed is selectively converted to heavy products such as diesel and kerosene with a low yield of lighter hydrocarbons such as naphtha and gas. Pressure is also moderate to limit the hydrogenation of the bottoms product to an optimal level for downstream processing. Mild hydrocracking conditions will provide total conversion of about 20 to about 60 vol-%, preferably about 20 to about 50 vol-%, total conversion of the hydrocarbon feed to products boiling below the diesel cut point. In a mild hydrocracking operation, the hydrotreating catalyst has just as much or a greater role in conversion than the hydrocracking catalyst. Conversion across the hydrotreating catalyst may be a significant portion of the overall conversion. If the first hydroprocessing reactor 42 is intended for mild hydrocracking, it is contemplated that the mild hydrocracking reactor 36 may be loaded with all hydrotreating catalyst, all hydrocracking catalyst, or some beds of hydrotreating catalyst and beds of hydrocracking catalyst. In the last case, the beds of hydrocracking catalyst may typically follow beds of hydrotreating catalyst. Most typically, three beds of hydrotreating catalyst may be followed by zero, one or two 2 beds of hydrocracking catalyst.

The first hydroprocessing reactor 42 in FIG. 1 has four beds in one reactor vessel. If mild hydrocracking is desired, it is contemplated that the first three catalyst beds comprise hydrotreating catalyst and the last catalyst bed comprise hydrocracking catalyst. If partial or full hydrocracking is preferred, additional beds of hydrocracking catalyst may be used than in mild hydrocracking.

In one aspect, for example, when a balance of middle distillate and gasoline is preferred in the converted product, mild hydrocracking may be performed in the first hydroprocessing reactor 42 with hydrocracking catalysts that utilize amorphous silica-alumina bases or low-level zeolite bases combined with one or more Group VIII or Group VIB metal hydrogenating components. In another aspect, when middle distillate is significantly preferred in the converted product over gasoline production, partial or full hydrocracking may be performed in the first hydroprocessing reactor 42 with a catalyst which comprises, in general, any crystalline zeolite cracking base upon which is deposited a Group VIII metal hydrogenating component. Additional hydrogenating components may be selected from Group VIB for incorporation with the zeolite base.

The zeolite cracking bases are sometimes referred to in the art as molecular sieves and are usually composed of silica, alumina and one or more exchangeable cations such as sodium, magnesium, calcium, rare earth metals, etc. They are further characterized by crystal pores of relatively uniform diameter between about 4 and about 14 Angstroms ($10^{-10}$ meters). It is preferred to employ zeolites having a relatively high silica/alumina mole ratio between about 3 and about 12. Suitable zeolites found in nature include, for example, mordenite, stilbite, heulandite, ferrierite, dachiardite, chabazite, erionite and faujasite. Suitable synthetic zeolites include, for example, the B, X, Y and L crystal types, e.g., synthetic faujasite and mordenite. The preferred zeolites are those having crystal pore diameters between about 8-12 Angstroms ($10^{-10}$ meters), wherein the silica/alumina mole ratio is about 4 to 6. One example of a zeolite falling in the preferred group is synthetic Y molecular sieve.

The natural occurring zeolites are normally found in a sodium form, an alkaline earth metal form, or mixed forms. The synthetic zeolites are nearly always prepared first in the sodium form. In any case, for use as a cracking base it is preferred that most or all of the original zeolitic monovalent metals be ion-exchanged with a polyvalent metal and/or with an ammonium salt followed by heating to decompose the ammonium ions associated with the zeolite, leaving in their place hydrogen ions and/or exchange sites which have actually been decationized by further removal of water. Hydrogen or "decationized" Y zeolites of this nature are more particularly described in U.S. Pat. No. 3,130,006.

Mixed polyvalent metal-hydrogen zeolites may be prepared by ion-exchanging first with an ammonium salt, then partially back exchanging with a polyvalent metal salt and then calcining. In some cases, as in the case of synthetic mordenite, the hydrogen forms can be prepared by direct acid treatment of the alkali metal zeolites. In one aspect, the preferred cracking bases are those which are at least about 10 percent, and preferably at least about 20 percent, metal-cation-deficient, based on the initial ion-exchange capacity. In another aspect, a desirable and stable class of zeolites is one wherein at least about 20 percent of the ion exchange capacity is satisfied by hydrogen ions.

The active metals employed in the preferred hydrocracking catalysts of the present invention as hydrogenation components are those of Group VIII, i.e., iron, cobalt, nickel, ruthenium, rhodium, palladium, osmium, iridium and platinum. In addition to these metals, other promoters may also be employed in conjunction therewith, including the metals of Group VIB, e.g., molybdenum and tungsten. The amount of hydrogenating metal in the catalyst can vary within wide ranges. Broadly speaking, any amount between about 0.05 percent and about 30 percent by weight may be used. In the case of the noble metals, it is normally preferred to use about 0.05 to about 2 wt-%.

The method for incorporating the hydrogenating metal is to contact the base material with an aqueous solution of a suitable compound of the desired metal wherein the metal is present in a cationic form. Following addition of the selected hydrogenating metal or metals, the resulting catalyst powder is then filtered, dried, pelleted with added lubricants, binders or the like if desired, and calcined in air at temperatures of, e.g., about 371° to about 648° C. (about 700° to about 1200° F.) in order to activate the catalyst and decompose ammonium ions. Alternatively, the base component may first be pelleted, followed by the addition of the hydrogenating component and activation by calcining.

The foregoing catalysts may be employed in undiluted form, or the powdered catalyst may be mixed and copelleted with other relatively less active catalysts, diluents or binders such as alumina, silica gel, silica-alumina cogels, activated clays and the like in proportions ranging between about 5 and about 90 wt-%. These diluents may be employed as such or they may contain a minor proportion of an added hydrogenating metal such as a Group VIB and/or Group VIII metal. Additional metal promoted hydrocracking catalysts may also be utilized in the process of the present invention which comprises, for example, aluminophosphate molecular sieves, crystalline chromosilicates and other crystalline silicates. Crystalline chromosilicates are more fully described in U.S. Pat. No. 4,363,718.

By one approach, the hydrocracking conditions may include a temperature from about 290° C. (550° F.) to about 468° C. (875° F.), preferably 343° C. (650° F.) to about 435° C. (815° F.), a pressure from about 3.5 MPa (500 psig) to about 20.7 MPa (3000 psig), a liquid hourly space velocity (LHSV) from about 1.0 to less than about 2.5 $hr^{-1}$, and a hydrogen rate of about 421 to about 2,527 $Nm^3/m^3$ oil (2,500-15,000 scf/bbl). If mild hydrocracking is desired, conditions may include a temperature from about 315° C. (600° F.) to about 441° C. (825° F.), a pressure from about 5.5 to about 13.8 MPa (gauge) (800 to 2000 psig) or more preferably about 6.9 to about 11.0 MPa (gauge) (1000 to 1600 psig), a liquid hourly space velocity (LHSV) from about 0.5 to about 2 $hr^{-1}$ and preferably about 0.7 to about 1.5 $hr^{-1}$, and a hydrogen rate of about 421 to about 1,685 $Nm^3/m^3$ oil (2,500-10,000 scf/bbl).

The hydroprocessing performed in the first hydroprocessing reactor 42 may be hydrotreating. Hydrotreating is a process wherein hydrogen gas is contacted with hydrocarbon in the presence of suitable catalysts which are primarily active for the removal of heteroatoms, such as sulfur, nitrogen and metals from the hydrocarbon feedstock. In hydrotreating, hydrocarbons with double and triple bonds may be saturated. Aromatics may also be saturated. Some hydrotreating processes are specifically designed to saturate aromatics.

Suitable hydrotreating catalysts for use in the present invention are any known conventional hydrotreating catalysts and include those which are comprised of at least one Group VIII metal, preferably iron, cobalt and nickel, more preferably cobalt and/or nickel and at least one Group VI metal, preferably molybdenum and tungsten, on a high surface area support material, preferably alumina. Other suitable hydrotreating catalysts include zeolitic catalysts, as well as noble metal catalysts where the noble metal is selected from palladium and platinum. It is within the scope of the present invention that more than one type of hydrotreating catalyst be used in the same vessel in the second hydroprocessing reactor 92. The Group VIII metal is typically present in an amount ranging from about 2 to about 20 wt-%, preferably from about 4 to about 12 wt-%. The Group VI metal will typically be present in an amount ranging from about 1 to about 25 wt-%, preferably from about 2 to about 25 wt-%.

Preferred hydrotreating reaction conditions include a temperature from about 290° C. (550° F.) to about 455° C. (850° F.), suitably 316° C. (600° F.) to about 427° C. (800° F.) and preferably 343° C. (650° F.) to about 399° C. (750° F.), a pressure from about 3.4 MPa (500 psig), preferably about 4.1 MPa (600 psig), to about 6.2 MPa (900 psig), a liquid hourly space velocity of the fresh hydrocarbonaceous feedstock from about 0.5 $hr^{-1}$ to about 4 $hr^{-1}$, preferably from about 1.5 to about 3.5 $hr^{-1}$, and a hydrogen rate of about 168 to about 1,011 $Nm^3/m^3$ oil (1,000-6,000 scf/bbl), preferably about 168 to about 674 $Nm^3/m^3$ oil (1,000-4,000 scf/bbl) for diesel feed, with a hydrotreating catalyst or a combination of hydrotreating catalysts.

The hydroprocessing performed in the first hydroprocessing reactor 42 may be hydroisomerization. Hydroisomerization may also include catalytic dewaxing. Hydroisomerization is a process in which in one aspect at least about 10 percent, in another aspect, at least about 50 percent and, in yet another aspect, about 10 to about 90 percent of the n-paraffins of the hydrocarbon feedstock are converted to iso-paraffins effective to provide an effluent with at least one of a cloud point value of about 0° C. (32° F.) or less, a pour point value of about 0° C. (32° F.) or less, and/or a cold filter plugging point (CFPP) value of about 0° C. (32° F.) or less. In general, such hydroisomerization conditions include a temperature from about 260° C. (500° F.) to about 371° C. (700° F.), a pressure from about 1.38 MPa (200 psig) to about 8.27 MPa (1200 psig), a liquid hourly space velocity of the fresh hydrocarbon feedstock from about 0.1 $hr^{-1}$ to about 10 $hr^{-1}$ and a hydrogen rate of about 168 to about 1,011 $Nm^3/m^3$ oil (1,000-6,000 scf/bbl). However, other hydroisomerization conditions are also possible depending on the quality of the feed and other factors.

Suitable hydroisomerization catalysts are any known conventional hydroisomerization catalysts. For example, suitable catalysts can include zeolite components, hydrogenation/dehydrogenation components, and/or acidic components. In some forms, the catalysts can include at least one Group VIII metal such as a noble metal (i.e., platinum or palladium). In other forms, the catalyst may also include silico alumino phosphate and/or zeolite alumino silicate. Examples of suitable catalysts are disclosed in U.S. Pat. No. 5,976,351; U.S. Pat. No. 4,960,504; U.S. Pat. No. 4,788,378; U.S. Pat. No. 4,683,214; U.S. Pat. No. 4,501,926 and U.S. Pat. No. 4,419,220; however, other isomerization catalysts may also be used depending on the feedstock composition, operating conditions, desired output, and other factors.

A first hydroprocessing effluent exits the first hydroprocessing reactor 42 in line 44. If the first hydroprocessing reactor 42 is a hydrocracking reactor, the first hydroprocessing effluent in line 44 is hydrocracking effluent. The first hydroprocessing effluent in line 44 is heat exchanged with the first hydroprocessing feed in line 40 and in an embodiment may be cooled before entering a first cold separator 46. The first cold separator 46 is in downstream communication with the first hydroprocessing reactor 42. The first cold separator may be operated at about 46° to about 63° C. (115° to 145° F.) and just below the pressure of the first hydroprocessing reactor 42 accounting for pressure drop to keep hydrogen and light gases in the overhead and normally liquid hydrocarbons in the bottoms. The first cold separator 46 provides a vaporous first hydroprocessing effluent stream comprising hydrogen in an overhead line 48 and a liquid first hydroprocessing effluent stream in a bottoms line 50. The first cold separator also has a boot for collecting an aqueous phase in line 52.

The vaporous first hydroprocessing effluent stream which may be a vaporous hydrocracking effluent stream in line 48 may be compressed in a recycle gas compressor 54 to provide a recycle hydrogen stream in line 56. The recycle gas compressor 54 may be in downstream communication with the first hydroprocessing reactor 42 which may be a hydrocracking reactor. The recycle gas compressor 54 may compress a vaporous first hydroprocessing effluent stream comprising hydrogen in line 48 to provide a recycle hydrogen stream in a recycle hydrogen line 56. The second compressed make-up hydrogen stream in line 34 joins the recycle hydrogen in line 56 which is a compressed vaporous first hydroprocessing effluent stream to provide first hydroprocessing hydrogen stream in line 36. The hydrocracking reactor 42 is in downstream communication with the recycle hydrogen line 56 via lines 36 and 40.

As previously explained, in an embodiment, the recycle hydrogen stream in line 56 may join with the second compressed make-up hydrogen stream in line 34 downstream of the recycle gas compressor 54. However, if the pressure of the recycle hydrogen stream in line 56 is too great to admit the make-up hydrogen stream without adding more compressors upstream of the second compressed make-up hydrogen line 34, the second compressed make-up hydrogen stream may be added to the vaporous hydrocracking effluent stream in line 48 upstream of the recycle gas compressor 54. However, this would increase the duty on the recycle gas compressor 54 due to greater throughput.

At least a portion of the first hydroprocessing effluent stream in line 44 may be fractionated in a fractionation section 16 in downstream communication with the first hydroprocessing reactor 42 to produce a second hydrocarbon stream in line 86. In an aspect, the liquid first hydroprocessing effluent stream which may comprise a liquid hydrocracking effluent stream in line 50 may be fractionated in the fractionation section 16. In a further aspect, the fractionation section 16 may include a cold flash drum 58. The liquid first hydroprocessing effluent stream in line 50 may be flashed in the cold flash drum 58 which may be operated at the same temperature as the cold separator 46 but at a lower pressure of between about 1.4 MPa and about 3.1 MPa (gauge) (200-450 psig) to provide a light liquid stream in a bottoms line 62 from the liquid first hydroprocessing effluent stream and a light ends stream in an overhead line 64. The aqueous stream in line 52 from the boot of the cold separator may also be directed to the cold flash drum 58. A flash aqueous stream is removed from a boot in the cold flash drum 58 in line 66. The light liquid stream in bottoms line 62 may be further fractionated in the fractionation section 16.

The fractionation section 16 may include a stripping column 70 and a fractionation column 80. The light liquid stream in bottoms line 62 may be heated and fed to the stripping column 70. The light liquid stream which is a liquid first hydroprocessing effluent may be stripped with steam from line 72 to provide a light ends stream of hydrogen, hydrogen sulfide, steam and other gases in an overhead line 74. A portion of the light ends stream may be condensed and refluxed to the stripper column 70. The stripping column 70 may be operated with a bottoms temperature between about 232° and about 288° C. (450° to 550° F.) and an overhead pressure of about 690 to about 1034 kPa (gauge) (100 to 150 psig). A hydroprocessed bottoms stream in line 76 may be heated in a fired heater and fed to the fractionation column 80.

A portion of the hydroprocessed bottoms stream may be reboiled and returned to the stripper column 70 instead of using steam stripping.

The fractionation column 80 may also strip the hydrocracked bottoms with steam from line 82 to provide an overhead naphtha stream in line 84, a diesel stream in line 86 from a side cut and an unconverted oil stream in line 88 which may be suitable for further processing, such as in an FCC unit. The overhead naphtha stream in line 84 may require further processing before blending in the gasoline pool. It will usually require catalytic reforming to improve the octane number. The reforming catalyst will often require the overhead naphtha to be further desulfurized in a naphtha hydrotreater prior to reforming. In an aspect, the hydrocracked naphtha may be desulfurized in an integrated hydrotreating unit. It is also contemplated that a further side cut be taken to provide a separate light diesel or kerosene stream taken above a heavy diesel stream taken in line 86. A portion of the overhead naphtha stream in line 84 may be condensed and refluxed to the fractionation column 80. The fractionation column 80 may be operated with a bottoms temperature between about 288° and about 385° C. (550° to 725° F.), preferably between about 315° and about 357° C. (600° to 675° F.) and at or near atmospheric pressure. A portion of the hydrocracked bottoms may be reboiled and returned to the fractionation column 80 instead of using steam stripping.

The diesel stream in line 86 may be reduced in sulfur content but may not meet a low sulfur diesel (LSD) specification which is less than 50 wppm sulfur, an ULSD specification which is less than 10 wppm sulfur, or other specifications. Hence, it may be further finished in a second hydroprocessing unit 14 which may be a diesel hydrotreating unit 14. Accordingly, the diesel stream in line 86 may be a second hydrocarbon stream. The second hydrocarbon stream may have a lower average boiling point than the first hydrocarbon stream.

The second hydrocarbon stream in line 86 may be joined by a second hydroprocessing hydrogen stream comprising the second portion of the first compressed make-up hydrogen stream from the first split line 30 to provide a second hydroprocessing feed stream 90. The second hydrocarbon stream in line 86 may also be mixed with a co-feed that is not shown. The second hydroprocessing feed stream 90 may be heat exchanged with the second hydroprocessing effluent in line 94, further heated in a fired heater and directed to a second hydroprocessing reactor 92. Consequently, the second hydroprocessing reactor is in downstream communication with the fractionation section 16, the split 27 and the first hydroprocessing reactor 42. In the second hydroprocessing reactor 92, the second hydrocarbon stream which may be a diesel stream is hydroprocessed in the presence of the second hydroprocessing hydrogen stream and second hydroprocessing catalyst to provide a second hydroprocessing effluent stream 94.

The second hydroprocessing reactor 92 may comprise more than one vessel and multiple beds of catalyst. The second hydroprocessing reactor 92 in FIG. 1 has two beds in one reactor vessel. The second hydroprocessing reactor 92 may be operated as a hydrocracking reactor, a hydrotreating reactor or a hydroisomerization reactor loaded with appropriate catalyst as previously described with respect to the first hydroprocessing reactor 42. The second hydroprocessing reactor 92 may be in downstream communication with the second split line 30 and the first hydroprocessing reactor 42 which may be a hydrocracking reactor.

The hydroprocessing performed in the second hydroprocessing reactor 92 may be hydrotreating. In an aspect, the second hydroprocessing unit may be a hydrotreating unit 14 in which case, the second hydroprocessing hydrogen stream is a hydrotreating hydrogen stream in line 30, the second hydroprocessing reactor 92 is a hydrotreating reactor in downstream communication with the second split line 30 and the feed stream in line 90 is a hydrotreating feed stream.

In the hydrotreating reactor 92, hydrocarbons with heteroatoms may be further demetallized, desulfurized and denitrogenated by hydrotreating as previously described with respect to the first hydroprocessing unit 12. The hydrotreating reactor 92 may also contain hydrotreating catalyst that is suited for saturating aromatics, hydrodewaxing and hydroisomerization.

If the first hydroprocessing reactor 42 is operated as a mild hydrocracking reactor, the first hydroprocessing reactor 42 may convert up to about 20 to about 60 vol-% of feed boiling above diesel boiling range to product boiling below the diesel cut point. The second hydroprocessing reactor 92 may have very low conversion and may be primarily for desulfurization if integrated with the mild hydrocracking reactor 42 to meet fuel specifications such as qualifying as ULSD.

The second hydroprocessed effluent stream in line 94 may be heat exchanged with the second hydroprocessed feed stream in line 90. The second hydroprocessed effluent stream in line 94 may be separated in a second cold separator 96 to provide a vaporous second hydroprocessed effluent stream comprising hydrogen in an overhead line 98 and a liquid second hydroprocessed effluent stream in a bottoms line 100. The second cold separator 96 may be operated between about 46° to about 63° C. (115° to 145° F.) and just below the pressure of the second hydroprocessing reactor 42 accounting for pressure drop to keep hydrogen and light gases in the overhead and normally liquid hydrocarbons in the bottoms. An aqueous stream may be removed from the boot of the second cold separator 96 in line 102.

The vaporous second hydroprocessed effluent stream comprising hydrogen in line 98 may be recycled and added to the make-up hydrogen stream in line 20 upstream of the second compressor. In the "spill-back" embodiment of FIG. 1, the vaporous second hydroprocessed effluent stream comprising hydrogen in line 98 is added to the make-up hydrogen stream in line 20 upstream of the first make-up gas compressor 22 at a junction 25. The make-up gas in line 20 and recycled gas in line 98 join in line 26, mix and proceed to compression as previously described. Accordingly, the first compressor 22 and the second compressor 32 are in downstream communication with the overhead line 98.

The liquid second hydroprocessing effluent stream in line 100 may be fractionated in a fractionation column 104 which may be a stripper column. The liquid second hydroprocessing effluent stream in line 100 may be heated before being fed to the stripper column 104. The liquid second hydroprocessing effluent stream may be stripped in the stripper column 104 with steam from line 110 to provide a naphtha and light ends stream in overhead line 112. A product stream may be recovered in bottoms line 114. In an embodiment, the product stream is a diesel stream comprising less than 50 wppm sulfur qualifying it as LSD and preferably less than 10 wppm sulfur qualifying it as ULSD. It is contemplated that the stripper column 102 could be operated as a fractionation column with a reboiler instead of with stripping steam.

By recycling hydrogen from the second hydroprocessing unit 14 back to the intake side of the first compressor 22, the second hydroprocessing unit may operate without a recycle gas compressor. Recycle hydrogen from the second hydroprocessing unit 14 is further compressed and utilized in the first hydroprocessing unit 12.

Figure 2:
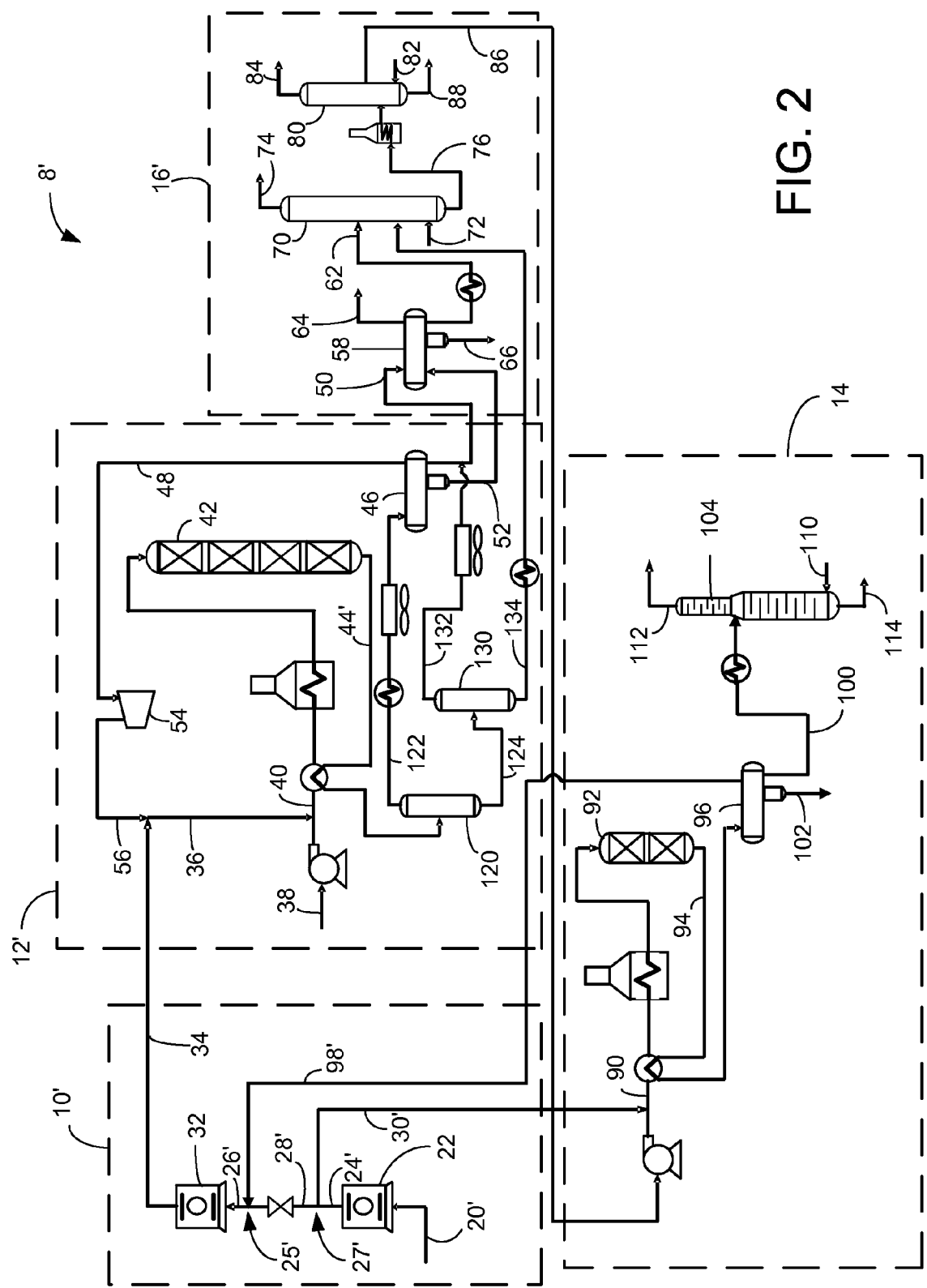
FIG. 2 is a simplified process flow diagram of an alternative embodiment of the present invention.

FIG. 2 illustrates a "spill-forward" embodiment of an apparatus and process 8' that recycles the vaporous second hydroprocessing effluent in line 98' to the second compressor 24 and utilizes a hot separator upstream of the first cold separator. Many of the elements in FIG. 2 have the same configuration as in FIG. 1 and bear the same reference number. Elements in FIG. 2 that correspond to elements in FIG. 1 but have a different configuration bear the same reference numeral as in FIG. 1 but are marked with a prime symbol ('). The embodiment of FIG. 2 differs from the embodiment of FIG. 1 in the compression section 10' and in the first hydroprocessing unit 12'.

In the compression section 10', a make-up hydrogen stream in a make-up hydrogen line 20' is fed to a first compressor 22 to boost the pressure of the make-up hydrogen stream and provide a first compressed make-up hydrogen stream in line 24'. The first compressor 22 may represent a series of compressors.

A split 27' on the first compressed make-up hydrogen line 24' allows a first portion of compressed make-up hydrogen to be taken in a first split line 28' and a second portion of compressed make-up hydrogen to be taken in a second split line 30'. The second portion of compressed make-up hydrogen in the second split line 30' is forwarded to the second hydroprocessing unit 14. A junction 25' between the second split line 28' and an overhead line 98' carrying the vaporous second hydroprocessing effluent provides communication between the overhead line 98' and the first split line 28'. A pressure let-down valve on the first split line 28' may equalize pressure between the first compressed make-up hydrogen stream and the vaporous second hydroprocessing effluent stream to allow admittance and mixture of the two streams in line 26'.

The mixture of the second portion of compressed make-up hydrogen in the first split line 28' and the vaporous second hydroprocessing effluent stream in line 26' may be further compressed in a second compressor 32, which may be a series of compressors to provide a second compressed make-up stream in line 34. Accordingly, the second compressor 32 is in downstream communication with the overhead line 98' which bypasses communication with the first compressor 22.

The second compressed make-up stream in line 34 may be joined by a recycle hydrogen stream in line 56 to provide a first hydroprocessing hydrogen stream in line 36. The first hydroprocessing hydrogen stream in line 36 taken from the second compressed make-up hydrogen stream may join a first hydrocarbon feed stream in line 38 to provide a first hydroprocessing feed stream in line 40. The rest of the embodiment of FIG. 2 operates as in FIG. 1 with the exception that follows.

The second difference in the embodiment of FIG. 2 over that in FIG. 1 is in the first hydroprocessing unit 12'. The hydroprocessing unit 12' may utilize a hot separator 120 in downstream communication with the first hydroprocessing reactor 42 via line 44' and provides a vaporous hydrocarbonaceous stream in an overhead line 122 and a liquid hydrocarbonaceous stream in a bottoms line 124. The hot separator 120 operates at about 177° to about 343° C. (350° to 650° F.) and preferably operates at about 232° to about 288° C. (450° to 550° F.). The hot separator may be operated at a slightly lower pressure than the hydrocracking reactor 36 accounting for pressure drop. The vaporous hydrocarbonaceous stream in line 122 may be cooled before entering the first cold separator 46. Consequently, the vaporous first hydroprocessed effluent may be separated in the first cold separator 46 to provide a vaporous hydrocracking effluent stream comprising hydrogen in line 48 and a liquid hydrocracking effluent in line 52 and which are processed as previously described with respect to FIG. 1. The first cold separator 46, therefore, is in downstream communication with the overhead line 122 of the hot separator 120.

The liquid hydrocarbonaceous stream in bottoms line 124 may be fractionated in the fractionation section 16'. In an aspect, the liquid hydrocarbonaceous stream in line 124 may be flashed in a hot flash drum 130 to provide a light ends stream in an overhead line 132 and a heavy liquid stream in a bottoms line 134. The hot flash drum 130 may be operated at the same temperature as the hot separator 120 but at a lower pressure of between about 1.4 MPa and about 3.1 MPa (gauge) (200 to 450 psig). The heavy liquid stream in bottoms line 134 may be further fractionated in the fractionation section 16'. In an aspect, the heavy liquid stream in line 134 may be introduced into the stripping column 70 at a lower elevation than the feed point light liquid stream in line 62.

The rest of the embodiment in FIG. 2 may be the same as described for FIG. 1 with the previous noted exception in the compression section 10'. The embodiment of the hot separator 120 just described in FIG. 2 may also be used in the embodiment of FIG. 1.

Preferred embodiments of this invention are described herein, including the best mode known to the inventors for carrying out the invention. It should be understood that the illustrated embodiments are exemplary only, and should not be taken as limiting the scope of the invention.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

In the foregoing, all temperatures are set forth in degrees Celsius and, all parts and percentages are by weight, unless otherwise indicated. Pressures are given at the vessel outlet and particularly at the vapor outlet in vessels with multiple outlets.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. An apparatus for hydroprocessing two hydrocarbon streams comprising:
   a make-up hydrogen line for carrying a make-up hydrogen stream;
   a first compressor in communication with said make-up hydrogen line for compressing said make-up hydrogen stream to provide a first compressed make-up hydrogen stream;
   a split in communication with said first compressor for splitting said first compressed make-up hydrogen stream into a first portion in a first split line and a second portion in a second split line;
   a second compressor in communication with said first split line for compressing said first portion of said first compressed make-up hydrogen stream to provide a second compressed make-up hydrogen stream in a second compressed make-up hydrogen line;
   a first hydroprocessing reactor in communication with said first split line for hydroprocessing a first hydrocarbon stream;
   a second hydroprocessing reactor in communication with said second split line for hydroprocessing a second hydrocarbon stream;
   a separator in communication with said second hydroprocessing reactor for separating a second hydroprocessing effluent stream into a vaporous second hydroprocessing effluent stream comprising hydrogen in an overhead line;
   said second compressor is in communication with said overhead line; and
   said first compressor is in communication with said overhead line at a junction on said make-up hydrogen line.

2. The apparatus of claim 1 further comprising a pressure let down valve on said first split line between said split and said junction.

3. The apparatus of claim 1 further comprising a recycle gas compressor in communication with said first hydroprocessing reactor for compressing a vaporous first hydroprocessing effluent stream comprising hydrogen to provide a recycle hydrogen stream in a recycle hydrogen line.

4. The apparatus of claim 1 wherein said first hydroprocessing reactor is in communication with said recycle hydrogen line.

5. The apparatus of claim 4 wherein said second compressed make-up hydrogen line joins said recycle hydrogen line.

6. The apparatus of claim 1 further comprising a fractionation section in communication with the first hydroprocessing reactor for fractionating a first hydroprocessing effluent stream to produce said second hydrocarbon stream.

7. The apparatus of claim 1, wherein said separator also separates said second hydroprocessing effluent stream into a liquid second hydroprocessing effluent stream in a bottoms line and a fractionation column in communication with said bottoms line for fractionating said liquid second hydroprocessing effluent into diesel.

8. The apparatus of claim 1 further comprising a cold separator in communication with the first hydroprocessing reactor for providing the vaporous first hydroprocessing effluent stream comprising hydrogen in an overhead line and the liquid first hydroprocessing effluent stream in a bottoms line.

9. The apparatus of claim 8 further comprising a hot separator in communication with the first hydroprocessing reactor for providing a vaporous hydrocarbonaceous stream in an overhead line and a liquid hydrocarbonaceous stream in a bottoms line and the cold separator in communication with the overhead line of the hot separator.

10. An apparatus for hydroprocessing two hydrocarbon streams comprising:
   a make-up hydrogen line for carrying a make-up hydrogen stream;
   a first compressor in communication with said make-up hydrogen line for compressing said make-up hydrogen stream to provide a first compressed make-up hydrogen stream;
   a split in communication with said first compressor for splitting said first compressed make-up hydrogen stream into a first portion in a first split line and a second portion in a second split line comprising a second hydroprocessing hydrogen stream;
   a second compressor in communication with said first split line for compressing said first portion of said first compressed make-up hydrogen stream to provide a second compressed make-up hydrogen stream in a second compressed make-up hydrogen line;
   a hydrocracking reactor in communication with said first split line for hydrocracking a first hydrocarbon stream to lower boiling hydrocarbons;

a fractionation section including a stripping column in communication with the hydrocracking reactor for fractionating the first hydroprocessing effluent stream;

a hydrotreating reactor in communication with said second split line for hydrotreating a second hydrocarbon stream;

a separator in communication with said hydrotreating reactor for separating a second hydroprocessing effluent stream into a vaporous second hydroprocessing effluent stream comprising hydrogen in an overhead line and a liquid second hydroprocessing effluent stream in a bottoms line;

a fractionation column in communication with said bottoms line for fractionating said liquid second hydroprocessing effluent into diesel; and said second compressor being in communication with said overhead line.

11. The apparatus of claim 10 further comprising a recycle gas compressor in communication with said hydrocracking reactor for compressing a vaporous first hydroprocessing effluent stream comprising hydrogen to provide a recycle hydrogen stream and said hydrocracking reactor being in communication with said recycle gas compressor.

12. The apparatus of claim 10 further comprising a wherein said hydrotreating reactor is in communication with said fractionation section in communication with the said hydrocracking reactor for fractionating the first hydroprocessing effluent stream to produce said second hydrocarbon stream.

13. An apparatus for hydroprocessing two hydrocarbon streams comprising:

a make-up hydrogen line for carrying a make-up hydrogen stream;

a first compressor in communication with said make-up hydrogen line for compressing said make-up hydrogen stream to provide a first compressed make-up hydrogen stream;

a split in communication with said first compressor for splitting said first compressed make-up hydrogen stream into a first portion in a first split line and a second portion in a second split line comprising a second hydroprocessing hydrogen stream;

a second compressor in communication with said first split line for compressing said first portion of said first compressed make-up hydrogen stream to provide a second compressed make-up hydrogen stream in a second compressed make-up hydrogen line;

a hydrocracking reactor in communication with said first split line for hydrocracking a first hydrocarbon stream to lower boiling hydrocarbons;

a hydrotreating reactor in communication with said second split line for hydrotreating a second hydrocarbon stream;

a separator in communication with said hydrotreating reactor for separating a second hydroprocessing effluent stream into a vaporous second hydroprocessing effluent stream comprising hydrogen in an overhead line; and said first compressor is in communication with said overhead line at a junction on said make-up hydrogen line.

14. The apparatus of claim 13 further comprising a recycle gas compressor in communication with said hydrocracking reactor for compressing a vaporous first hydroprocessing effluent stream comprising hydrogen to provide a recycle hydrogen stream and said hydrocracking reactor being in communication with said recycle gas compressor.

15. The apparatus of claim 13 further comprising a fractionation section in communication with the hydrocracking reactor for fractionating a first hydroprocessing effluent stream to produce said second hydrocarbon stream.

16. The apparatus of claim 13 wherein said separator further separates said second hydroprocessing effluent stream into a liquid second hydroprocessing effluent stream in a bottoms line and a fractionation column in communication with said bottoms line for fractionating said liquid second hydroprocessing effluent into diesel.

\* \* \* \* \*